United States Patent
Karabinis (10) Patent No.: US 9,461,806 B2
(45) Date of Patent: Oct. 4, 2016

(54) PROVIDING DIFFERENT TRANSMIT AND/OR RECEIVE MODES IN DIFFERENT SECTORS OF A WIRELESS BASE STATION

(71) Applicant: ATC Technologies, LLC, Reston, VA (US)

(72) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 102 days.

(21) Appl. No.: 14/548,857

(22) Filed: Nov. 20, 2014

(65) Prior Publication Data

US 2015/0078218 A1    Mar. 19, 2015

Related U.S. Application Data

(62) Division of application No. 11/682,683, filed on Mar. 6, 2007, now Pat. No. 8,923,850.

(60) Provisional application No. 60/744,777, filed on Apr. 13, 2006.

(51) Int. Cl.

| H04L 5/00 | (2006.01) |
|---|---|
| H04B 7/185 | (2006.01) |
| H04B 7/26 | (2006.01) |
| H04L 5/14 | (2006.01) |
| H04W 16/14 | (2009.01) |
| H04W 88/10 | (2009.01) |

(52) U.S. Cl.
CPC ......... *H04L 5/0062* (2013.01); *H04B 7/18513* (2013.01); *H04B 7/18563* (2013.01); *H04B 7/2643* (2013.01); *H04L 5/14* (2013.01); *H04W 16/14* (2013.01); *H04W 88/10* (2013.01)

(58) Field of Classification Search
None
See application file for complete search history.

(56) References Cited

U.S. PATENT DOCUMENTS

| 4,901,307 A | 2/1990 | Gilhousen et al. |
| 5,073,900 A | 12/1991 | Mallinckrodt |
| 5,303,286 A | 4/1994 | Wiedeman |
| 5,327,572 A | 7/1994 | Freeburg |
| 5,339,330 A | 8/1994 | Mallinckrodt |
| 5,365,571 A | 11/1994 | Rha et al. |
| 5,394,561 A | 2/1995 | Freeburg |
| 5,432,780 A | 7/1995 | Smith et al. |
| 5,446,756 A | 8/1995 | Mallinckrodt |

(Continued)

FOREIGN PATENT DOCUMENTS

| EP | 0 506 255 A2 | 9/1992 |
| EP | 0 597 225 A1 | 5/1994 |

(Continued)

OTHER PUBLICATIONS

Invitation to Pay Additional Fees with Partial International Search Report, PCT/US2007/006969, Nov. 15, 2007.

(Continued)

*Primary Examiner* — Kodzovi Acolatse
(74) *Attorney, Agent, or Firm* — Myers Bigel & Sibley, P.A.

(57) ABSTRACT

A wireless base station simultaneously transmits or receives wireless communications in different modes in different sectors of the wireless base station. The different modes may comprise a Time Division Duplex (TDD) mode and a non-TDD mode, and/or different air interfaces. Related methods and systems are described.

4 Claims, 8 Drawing Sheets

(56) References Cited

U.S. PATENT DOCUMENTS

| | | |
|---|---|---|
| 5,448,623 A | 9/1995 | Wiedeman et al. |
| 5,485,631 A | 1/1996 | Bruckert |
| 5,511,233 A | 4/1996 | Otten |
| 5,555,257 A | 9/1996 | Dent |
| 5,584,046 A | 12/1996 | Martinez et al. |
| 5,598,404 A | 1/1997 | Hayashi et al. |
| 5,612,703 A | 3/1997 | Mallinckrodt |
| 5,619,525 A | 4/1997 | Wiedeman et al. |
| 5,631,898 A | 5/1997 | Dent |
| 5,734,983 A | 3/1998 | Faruque |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,850,608 A | 12/1998 | Faruque |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,951,709 A | 9/1999 | Tanaka |
| 5,960,349 A | 9/1999 | Chheda et al. |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,091,936 A | 7/2000 | Chennakeshu et al. |
| 6,097,752 A | 8/2000 | Wiedeman et al. |
| 6,101,385 A | 8/2000 | Monte et al. |
| 6,108,561 A | 8/2000 | Mallinckrodt |
| 6,128,469 A | 10/2000 | Zenick, Jr. et al. |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,243,587 B1 | 6/2001 | Dent et al. |
| 6,253,080 B1 | 6/2001 | Wiedeman et al. |
| 6,256,497 B1 | 7/2001 | Chambers |
| 6,289,221 B1 | 9/2001 | Ritter |
| 6,311,074 B1 | 10/2001 | Lüders |
| 6,317,412 B1 | 11/2001 | Natali et al. |
| 6,324,405 B1 | 11/2001 | Young et al. |
| 6,339,707 B1 | 1/2002 | Wainfan et al. |
| 6,339,708 B1 | 1/2002 | Wang |
| 6,389,336 B2 | 5/2002 | Cellier |
| 6,396,819 B1 | 5/2002 | Fleeter et al. |
| 6,405,044 B1 | 6/2002 | Smith |
| 6,418,147 B1 | 7/2002 | Wiedeman |
| 6,449,461 B1 | 9/2002 | Otten |
| 6,522,865 B1 | 2/2003 | Otten |
| 6,560,459 B1 | 5/2003 | Wong |
| 6,628,919 B1 | 9/2003 | Curello et al. |
| 6,678,520 B1 | 1/2004 | Wang |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,174,127 B2 | 2/2007 | Otten et al. |
| 7,181,161 B2 | 2/2007 | Karabinis |
| 2001/0046866 A1 | 11/2001 | Wang |
| 2002/0077099 A1 | 6/2002 | LaPrade |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0054815 A1* | 3/2003 | Karabinis .......... H04B 7/18543 455/427 |
| 2003/0078040 A1 | 4/2003 | Mayfield et al. |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192395 A1 | 9/2004 | Karabinis |
| 2004/0203393 A1 | 10/2004 | Chen |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0174954 A1* | 8/2005 | Yun .................... H04W 16/32 370/310 |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135060 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |

(56) References Cited

U.S. PATENT DOCUMENTS

| | | |
|---|---|---|
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0161389 A1* | 7/2007 | Khandekar ........... H04W 48/12 455/517 |
| 2007/0184778 A1 | 8/2007 | Mechaley, Jr. |

FOREIGN PATENT DOCUMENTS

| | | |
|---|---|---|
| EP | 0 717 577 A2 | 6/1996 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 926 844 A2 | 6/1999 |
| EP | 0 926 844 A3 | 6/1999 |
| EP | 1 047 278 A2 | 10/2000 |
| EP | 1 047 278 A3 | 10/2000 |
| EP | 1 059 826 A1 | 12/2000 |
| EP | 1 193 989 A1 | 4/2002 |
| EP | 1 565 017 A2 | 8/2005 |
| WO | WO 01/54314 A1 | 7/2001 |
| WO | WO 02/03722 A1 | 1/2002 |

OTHER PUBLICATIONS

Notification of Transmittal of the International Search Report and the Written Opinion of the International Searching Authority, or the Declaration, International Search Report and Written Opinion of the International Searching Authority, PCT/US2007/006969, Feb. 25, 2008.

International Preliminary Report on Patentability, PCT/US2007/006969, Sep. 11, 2008.

Ayyagari et al., "A satellite-augmented cellular network concept", *Wireless Networks*, Vo. 4, 1998, pp. 189-198.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Qiu et al. "Dynamic Resource Allocation with Interference Avoidance for Fixed Wireless Systems" *IEEE International Symposium on Personal, Indoor and Mobile Radio Communications* 3:1433-1437 (1998).

Wang et al. "Interference Analysis of TDD-CDMA Systems with Directional Antennas" *IEEE 58th Vehicular Technology Conference*, 2:1369-1373 (2003).

* cited by examiner

PROVIDING DIFFERENT TRANSMIT AND/OR RECEIVE MODES IN DIFFERENT SECTORS OF A WIRELESS BASE STATION

CROSS-REFERENCE TO RELATED APPLICATIONS

This application is a divisional of U.S. patent application Ser. No. 11/682,683, entitled Systems and Methods for Controlling Base Station Sectors to Reduce Potential Interference With Low Elevation Satellites, filed Mar. 6, 2007, which itself claims the benefit of Provisional Application No. 60/744,777, filed Apr. 13, 2006, entitled Systems and Methods for Controlling Base Station Sectors to Reduce Potential Interference With Low Elevation Satellites, assigned to the assignee of the present invention, the disclosures of both of which are hereby incorporated herein by reference in their entirety as if set forth fully herein.

FIELD OF THE INVENTION

This invention relates to wireless communications systems, methods and components thereof and more particularly to satellite and terrestrial wireless communications systems, methods and components thereof.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," a "wireless transmitter," a "wireless receiver," a "transceiver" or simply as a "terminal". As used herein, the term(s) "radioterminal," "radiotelephone," "mobile terminal," "user device," "wireless transmitter," "wireless receiver," "transceiver" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e. g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Many of the above-cited patents and publications can reduce or eliminate intra-system interference that is caused by terrestrial use and/or reuse of satellite frequencies by an ancillary terrestrial network. However, inter-system interference also can be caused by terrestrial use and/or reuse of satellite frequencies by an ancillary terrestrial network and/or radioterminals communicating therewith.

SUMMARY OF THE INVENTION

Interference between satellite radioterminal communications systems may be reduced, according to some embodiments of the present invention, by transmitting and receiving satellite uplink frequencies in a Time Division Duplex (TDD) mode by a wireless base station in a first sector thereof, while simultaneously refraining from transmitting and receiving satellite uplink frequencies in the TDD mode by the wireless base station in a second sector thereof that points to a low elevation angle satellite. In other embodiments, satellite uplink frequencies may be transmitted and received in the TDD mode by a satellite that communicates with radioterminals in the second sector.

Many embodiments of simultaneously refraining from transmitting and receiving satellite uplink frequencies in the TDD mode by the wireless base station in the second sector thereof, may be provided according to various embodiments of the present invention. For example, in some embodiments, the wireless base station refrains from transmitting and receiving satellite uplink frequencies in the TDD mode and in a non-TDD mode in the second sector thereof. In other embodiments, satellite downlink frequencies are transmitted in a non-TDD mode by the wireless base station in the second sector thereof. In still other embodiments, satellite downlink frequencies are transmitted and received in the TDD mode by the wireless base station in the second sector thereof.

In still other embodiments, the wireless base station simultaneously refrains from transmitting and receiving satellite uplink frequencies in the TDD mode in a second sector thereof that points to a low elevation angle satellite, and/or that has a direct line-of-sight path to the low elevation satellite. In other embodiments, the sector points to the low elevation angle satellite and is also located near a coastline.

Other embodiments of the invention provide sectorization methods for a wireless base station. These sectorization methods may comprise transmitting and receiving uplink frequencies in a TDD mode by the wireless base station in a first sector thereof, while simultaneously refraining from transmitting and receiving uplink frequencies in the TDD mode by the wireless base station in a second sector thereof. Simultaneously refraining from transmitting and receiving uplink frequencies in the TDD mode in the second sector may be provided by refraining from transmitting or receiving uplink frequencies in the TDD mode and in a non-TDD mode in the second sector, by transmitting downlink frequencies in a non-TDD mode in the second sector and/or by transmitting and receiving downlink frequencies in the TDD mode in the second sector.

Still other embodiments of the present invention provide sectorization methods for a wireless base station that comprise simultaneously transmitting or receiving wireless communications in different modes in different sectors of the wireless base station. In some embodiments, the different modes may comprise a TDD mode and a non-TDD mode. In other embodiments, the different modes may comprise different air interfaces.

Embodiments of the invention have been described above in connection with methods of reducing interference between satellite radioterminal communication systems and sectorization methods for wireless base stations. However, other embodiments provide analogous systems for reducing wireless interference between satellite radioterminal communication systems and analogous sectorization systems for a wireless communications system. In these systems, a wireless base station may be configured according to any of the above-described embodiments. Moreover, still other embodiments of the present invention provide a wireless base station itself that is configured according to any of the above-described embodiments.

DETAILED DESCRIPTION

Specific embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Embodiments of the present invention will be described herein in connection with potential interference that may be caused by components of a first wireless communications system (e.g., a first satellite radioterminal communications system) to components of a first and/or a second wireless communications system (e.g., a first and/or a second satellite radioterminal communications system), and solutions to reduce or eliminate this potential interference. In some embodiments, the first satellite radioterminal communications system may be a satellite radioterminal communications system that is operated by Mobile Satellite Ventures, LP ("MSV") and the second satellite radioterminal communications system may be an Asia Cellular Satellite ("ACeS") and/or an Inmarsat system. However, other first and second satellite radioterminal communications systems may be provided according to other embodiments of the present invention. It will be understood that two or more embodiments of the present invention as presented herein may be combined in whole or in part to form one or more additional embodiments.

As used herein, the term "Time Division Duplex" means that a given frequency is used for uplink and downlink communications at different times. Moreover, as used herein, "uplink frequency" and "downlink frequency" define a frequency in a frequency band that is assigned for uplink or downlink communications, respectively, by a regulatory authority.

Figure 1A:
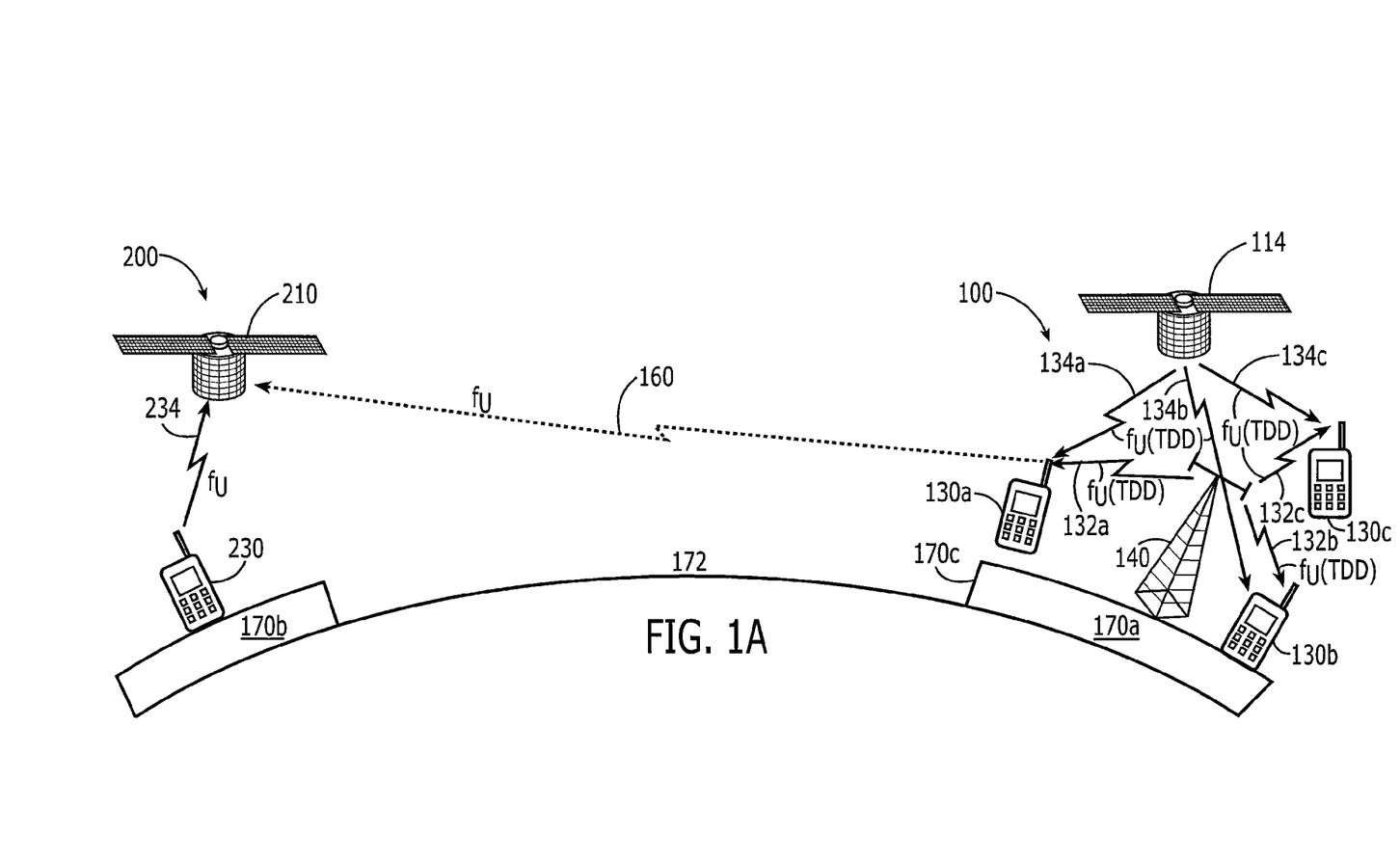
FIG. 1A is a schematic diagram illustrating potential interference that may be caused by a first satellite radioterminal communications system to a second satellite radioterminal communications system.

FIG. 1A is a schematic diagram illustrating potential interference that may be caused by a first satellite radioterminal communications system to a second satellite radioterminal communications system. As shown in FIG. 1A, the first satellite radioterminal communications system 100 includes a first space-based component, such as one or more first satellites 114 and one or more ancillary terrestrial components (ATC) 140 (also referred to herein as an "ATC base station", a "wireless base station" or a "base station") that serve a plurality of first radioterminals 130a, 130b, 130c. As shown in FIG. 1A, satellite uplink frequencies $f_U$ are used to transmit communications to the first radioterminals 130a, 130b, 130c by the ancillary terrestrial component 140 and/or by the first satellite 114 when the system operates in Time Division Duplex (TDD) mode. In some embodiments, the first satellite radioterminal communications system 100 may serve a first landmass 170a. In some embodiments, the first satellite radioterminal communications system 100 may be embodied as a system that uses and/or reuses satellite frequencies terrestrially via an ancillary terrestrial network comprising one or more terrestrial components 140, and which may be embodied by an MSV system. It will be understood that more than one first satellite 114 may be provided and, typically, large numbers of ancillary terrestrial components 140 and first radioterminals 130 may be provided.

Figure 1B:
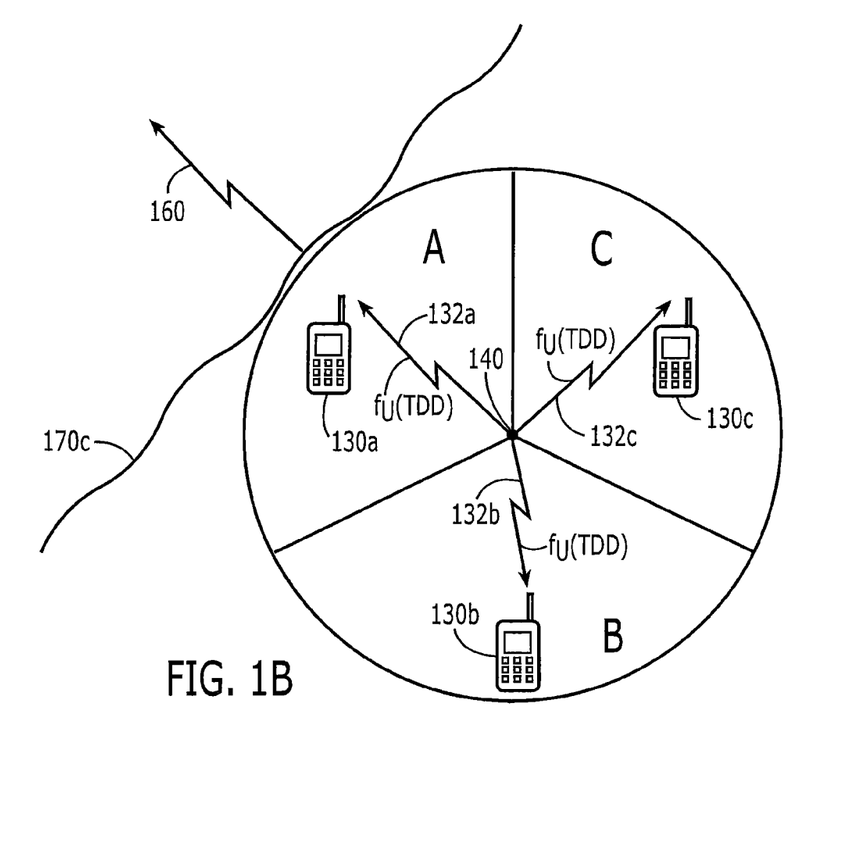
FIG. 1B is a plan view of sectors of a given ancillary terrestrial component of FIG. 1A.

In particular, FIG. 1A illustrates three first radioterminals 130a, 130b, 130c, a respective one of which may be located in a respective one of three (or more) sectors of an ancillary terrestrial component 140. Specifically, radiation by an ancillary terrestrial component 140 may be divided into sectors, such as three sectors of 120° each, to allow greater frequency reuse, in a manner similar to the sectorization of conventional terrestrial base stations of conventional cellular/PCS systems. FIG. 1B is a plan view of sectors A, B and C for a given ancillary terrestrial component 140. The TDD transmissions by the ancillary terrestrial component 140 to a respective radioterminal 130a, 130b, 130c in a respective sector A, B, C of the ancillary terrestrial component 140, are indicated by the respective transmission links 132a, 132b, 132c. Moreover, the satellite 114 may also communicate with the plurality of first radioterminals 130a, 130b, 130c using one or more antenna patterns (spot beams), such as antenna patterns (spot beams) 134a, 134b, 134c, in TDD mode.

Still referring to FIG. 1A, a second satellite radioterminal communications system 200 may include a space-based component, such as one or more second satellites 210, that communicate with at least one second radioterminal 230, using at least some of the same band of satellite frequencies $f_U$, over a satellite uplink 234. The second radioterminal(s) 230 may operate on a second landmass 170b that is widely spaced apart from the first landmass 170a, for example by an ocean 172. The second satellite system 200 may be embodied, for example, in an ACeS or Inmarsat communications network that serves Africa, Europe and/or parts of Asia. It will be understood by those having skill in the art that more than one second satellite 210 may be provided and, a large number of second radioterminals 230 may be provided.

As also shown in FIG. 1A, the ATC base station 140 operating in TDD mode using frequencies of a satellite uplink range $f_U$, such as the L-band satellite uplink range of 1625.5-1660.5 MHz, may cause interference to a receiver of a second satellite 210 that receives communications from the second radiotelephones 230 over an uplink 234 that uses frequencies of the satellite uplink range $f_U$. This potential interference path is illustrated as 160 in FIGS. 1A and 1B. Specifically, as shown in FIG. 1A, if the elevation angle between the ATC base station 140 and the second satellite 210 is small ("low-elevation angle satellite") and a Line-Of-Sight (LOS) path 160 exists between the ATC base station 140 and the second satellite 210, a radiation pattern of the ATC base station 140 may cause interference to a receiver of the second satellite 210.

More specifically, the low-elevation angle of the second satellite 210 may be caused due to the second satellite 210 serving a widely separated landmass. For example, with the MSV system 100 serving North America, and the ACeS system 200 serving parts of Asia, elevation angles of, for example, between 1° and 2° may be created for the ACeS satellite 210 relative to the MSV ATC base station 140. Moreover, ATC base stations 140 that are near the coastline 170c of the first landmass 170a that faces the second landmass 170b may experience very low blockage by buildings, mountains and/or other geographic features. Accordingly, there exists a possibility of creating an interference path 160 from the ATC base station 140 adjacent the coastline 170c to the low elevation angle second satellite 210 serving a landmass 170b across an ocean 172. Other potential interference scenarios also may be envisioned.

Figure 2A:
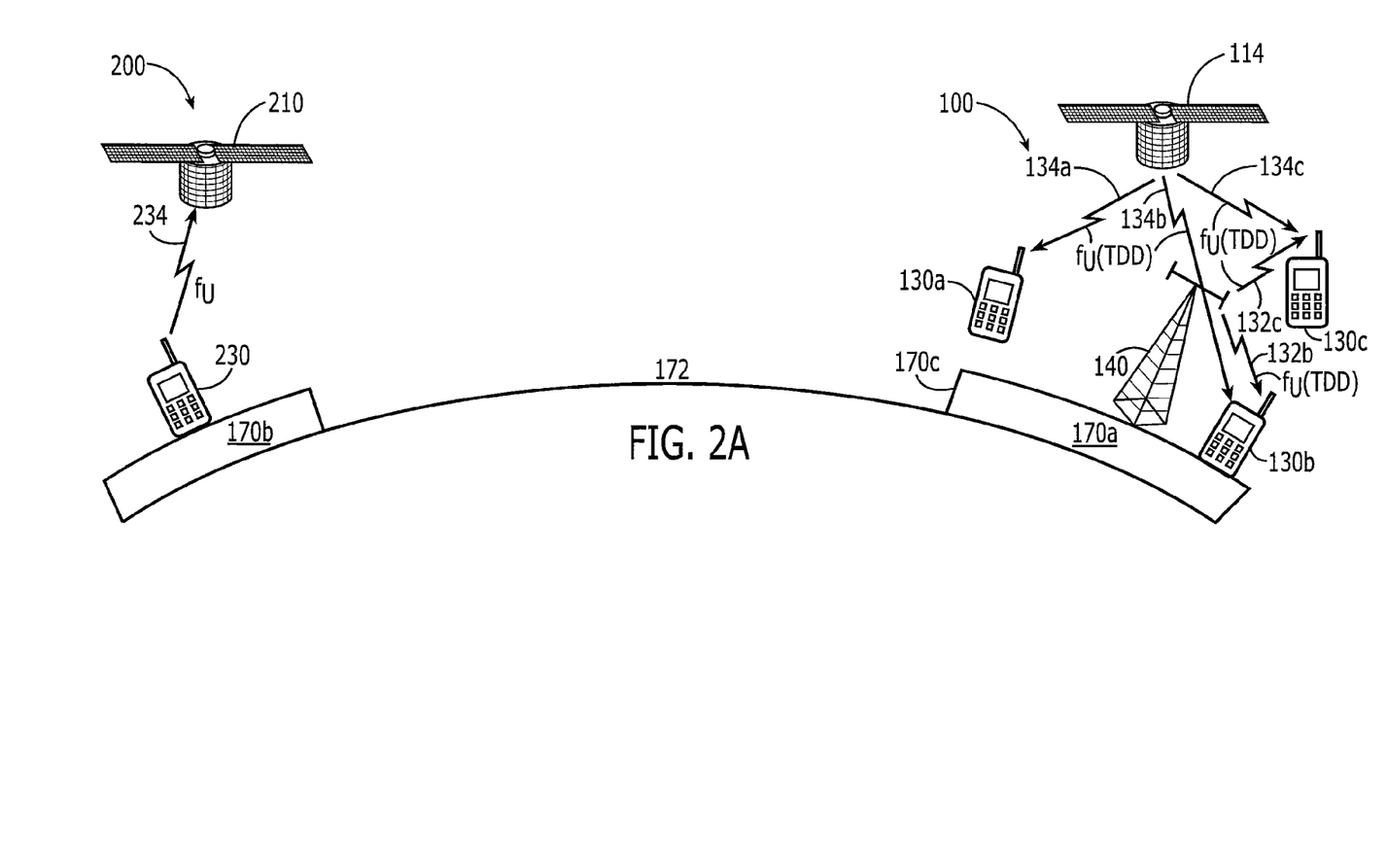
FIG. 2A is a schematic diagram illustrating reduction of potential interference that may be caused by a first satellite radioterminal communications system to a second satellite radioterminal communications system, according to some embodiments of the invention.
Figure 2B:
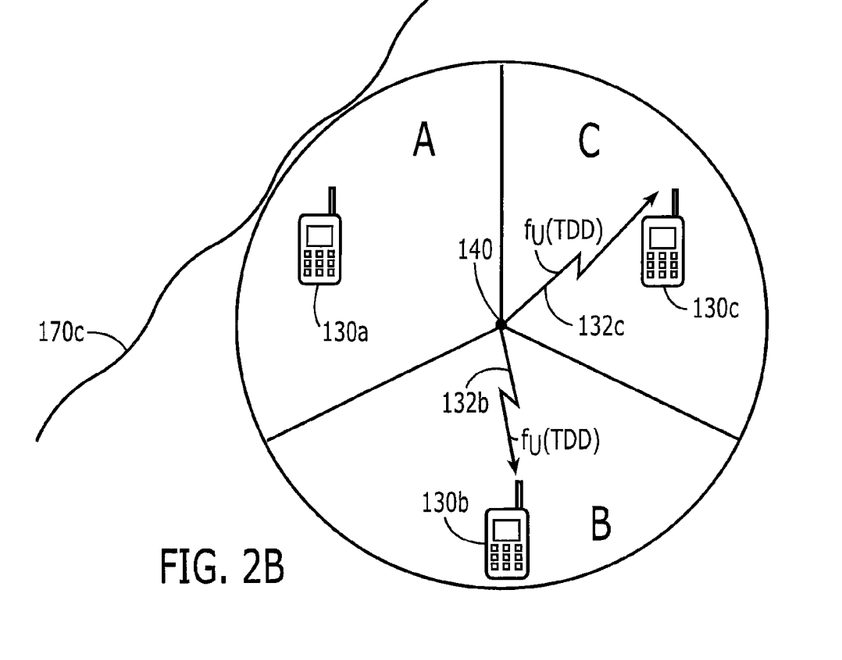
FIG. 2B is a plan view of sectors of a given ancillary terrestrial component of FIG. 2A, according to some embodiments of the present invention.
Figure 3A:
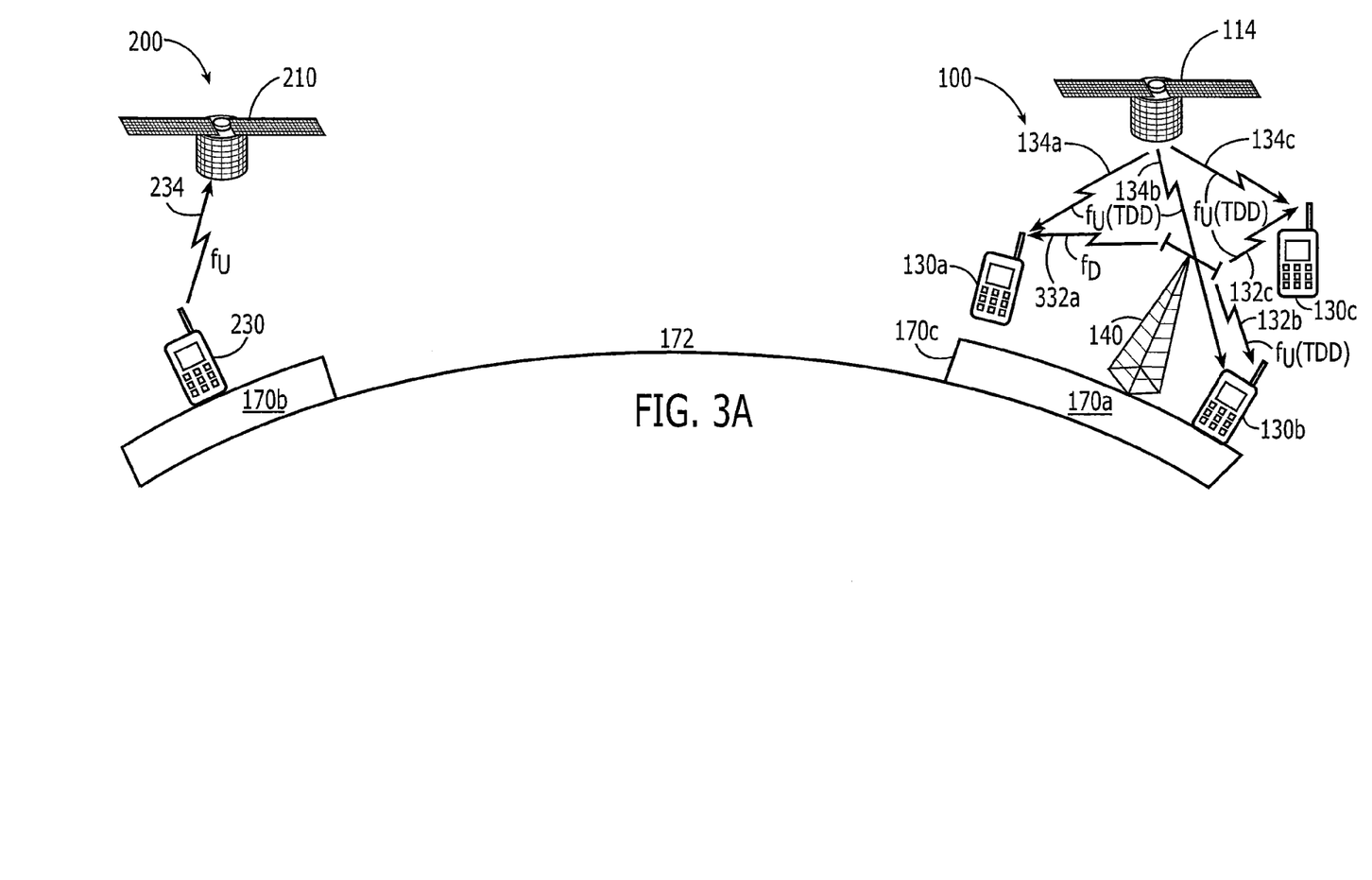
FIG. 3A is a schematic diagram illustrating reduction of potential interference that may be caused by a first satellite radioterminal communications system to a second satellite radioterminal communications system, according to other embodiments of the invention.
Figure 3B:
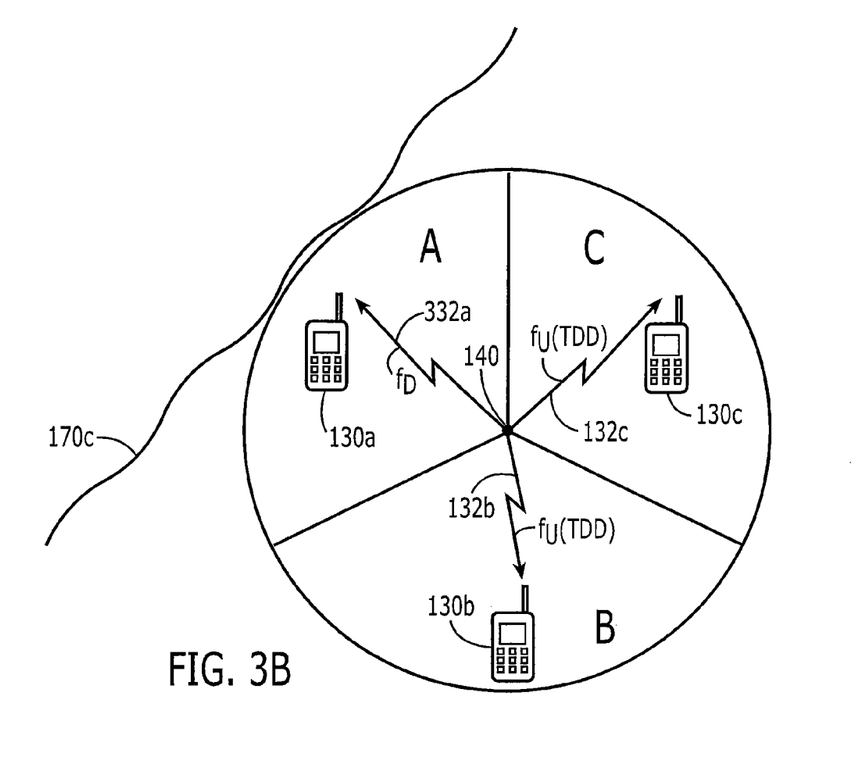
FIG. 3B is a plan view of sectors of a given ancillary terrestrial component of FIG. 3A, according to other embodiments of the present invention.
Figure 4A:
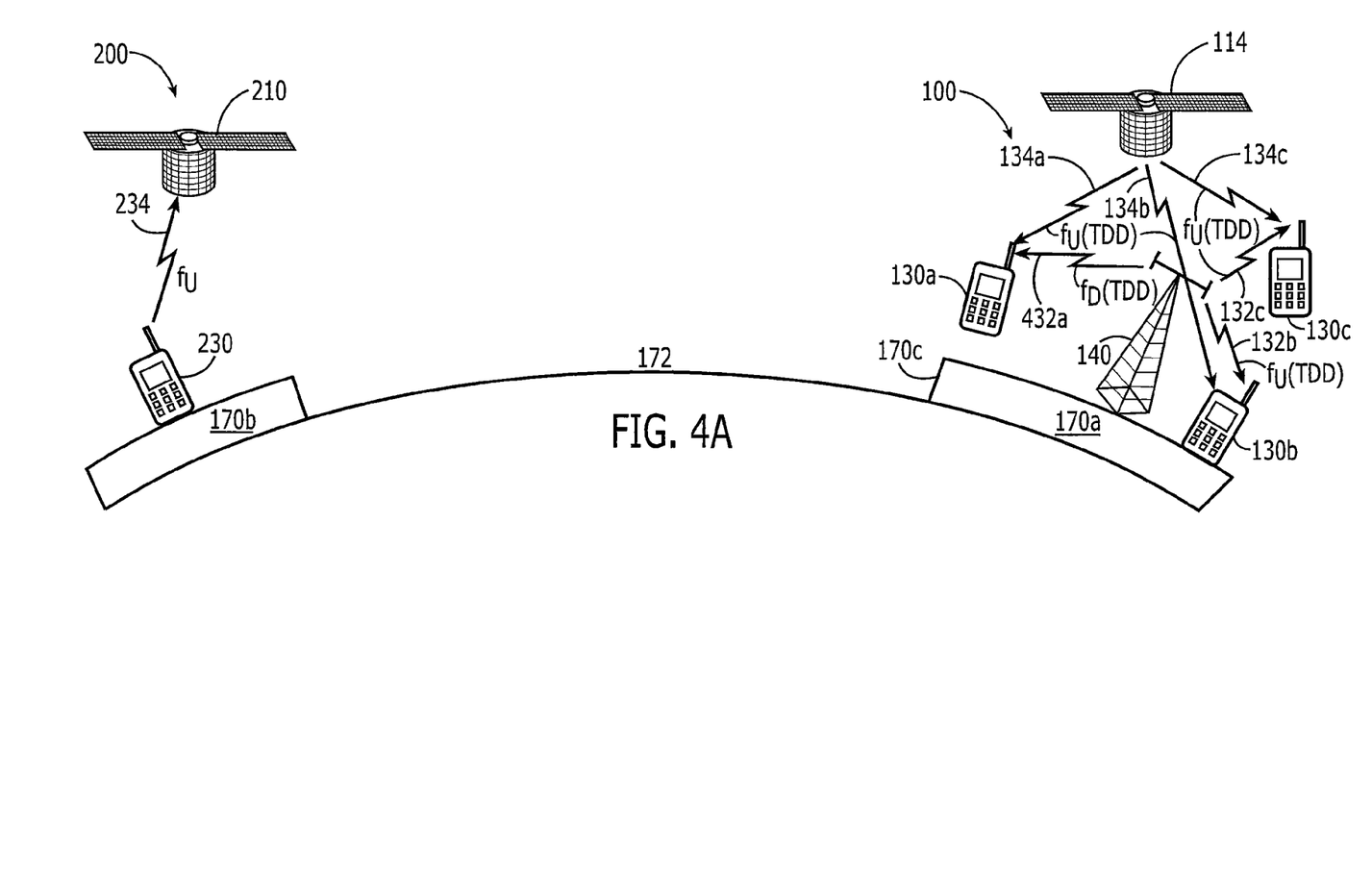
FIG. 4A is a schematic diagram illustrating reduction of potential interference that may be caused by a first satellite radioterminal communications system to a second satellite radioterminal communications system, according to still other embodiments of the invention.
Figure 4B:
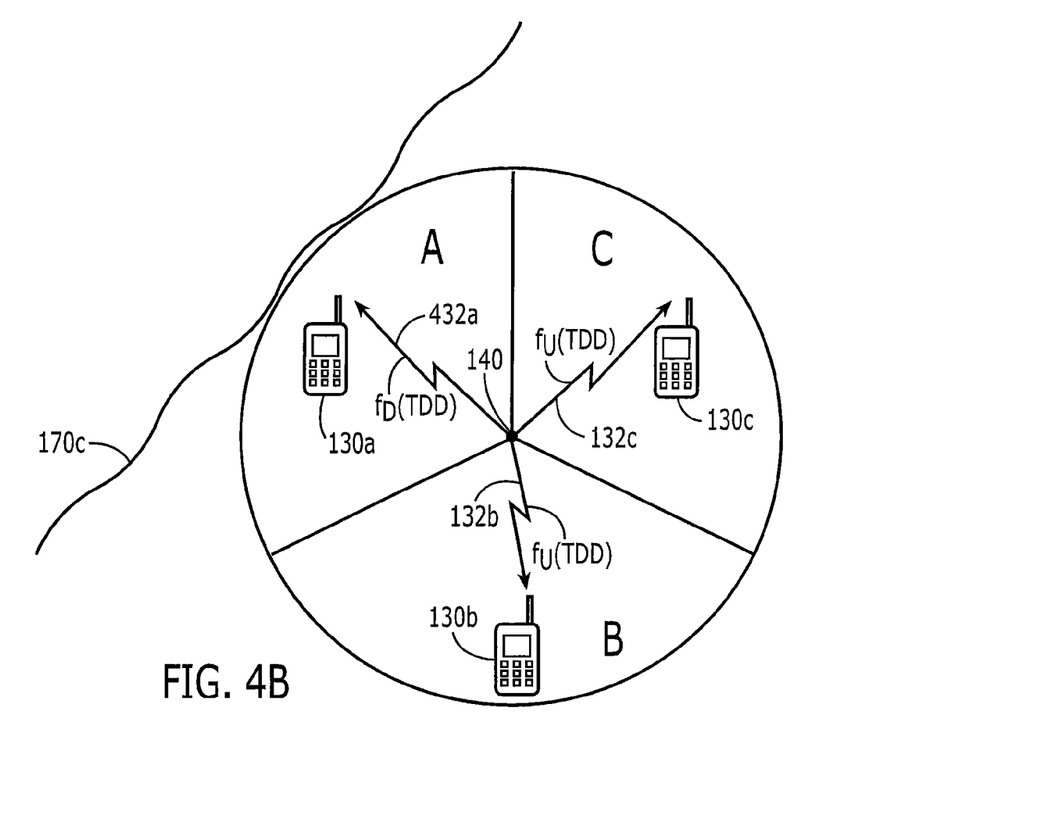
FIG. 4B is a plan view of sectors of a given ancillary terrestrial component of FIG. 4A, according to still other embodiments of the present invention.

Some embodiments of the present invention can reduce or eliminate this potential interference path 160 by refraining from radiating at least some frequencies of the satellite uplink range $f_U$, by one or more sectors of one or more ATC base stations 140 that is/are oriented substantially in the direction of the second satellite 210. For example, as shown in FIGS. 2A/2B, the potential interference path 160 of FIGS. 1A/1B may be reduced or eliminated by refraining from radiating by the base station 140 in a first sector A thereof over TDD link 132a using one or more uplink frequencies $f_U$. As shown in FIG. 2A, in some embodiments, communications with first radioterminal 130a in this first sector A may be provided via the satellite link 134a (in TDD or non-TDD mode). Alternatively, as shown in FIGS. 3A/3B, communications in this sector A may be provided via a non-TDD link 332a using a satellite downlink frequency $f_D$. In yet other embodiments, as shown in FIGS. 4A/4B, the given sector A may continue to operate in TDD mode, but using only satellite downlink frequencies $f_D$, as shown by link 432a of FIGS. 4A/4B.

Some embodiments of the invention may arise from recognition that an ancillary terrestrial component 140 operating in TDD mode and transmitting using frequencies of the satellite uplink frequency range $f_U$ may also be using frequencies of the satellite downlink range $f_D$, such as, for example, an L-band satellite downlink range of 1525-1559 MHz, and/or any other range of frequencies other than the satellite uplink range. These downlink frequencies $f_D$ and/or other range of frequencies may be used in a given sector to reduce or eliminate inter-system interference. It will be understood by those having skill in the art that the potential interference 160 may only occur when the ATC 140 is operating in TDD mode (or in reverse-band mode), such that the ATC 140 transmits to a radioterminal 130 using satellite uplink frequencies $f_U$ that may also be received by the second satellite 210. Since the orientation of the second satellite 210 relative to the ATC base station 140 may be known and/or may be determined by, for example, knowing the location or approximate location of the second satellite 210 at a geostationary arc, the sector A, B and/or C of the ATC base station 140 that points substantially towards the second satellite 210 may be modified as was described above, so that the sector that is in substantially a line-of-sight path 160 with the second satellite 200 can refrain from using one or more of the satellite uplink frequencies $f_U$. Interference with the second satellite radioterminal communications system 200 may thereby be reduced or eliminated.

Still other embodiments of the present invention may provide different modes of operation in different sectors of a wireless base station for any reason. The different modes of operations may include a TDD and a non-TDD mode and/or different air interfaces, but excludes the use of different frequency sets in different sectors, because different frequency sets are conventionally used in different sectors. Accordingly, in some embodiments, a wireless base station simultaneously transmits or receives wireless communications in different modes in different sectors of the wireless base station.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A sectorization method for a wireless base station comprising:
    simultaneously transmitting or receiving, by the wireless base station, wireless communications in different modes in different sectors of the wireless base station, wherein the different modes comprise a Time Division Duplex (TDD) mode and a non-TDD mode;
    wherein the wireless base station transmits in TDD mode in a sector of the wireless base station and simultaneously transmits in non-TDD mode in another sector of the wireless base station; and
    wherein the wireless base station receives in TDD mode in a sector of the wireless base station and simultaneously receives in non-TDD mode in another sector of the wireless base station.

2. A method according to claim 1 wherein the different modes comprise different air interfaces.

3. A sectorization system for a wireless communications system comprising:
    a wireless base station that is configured to simultaneously transmit or receive wireless communications in different modes in different sectors thereof, wherein the different modes comprise a Time Division Duplex (TDD) mode and a non-TDD mode;
    wherein the wireless base station comprises a transmitter that transmits in TDD mode in a sector of the wireless base station and simultaneously transmits in non-TDD mode in another sector of the wireless base station; and
    wherein the wireless base station comprises a receiver that receives in TDD mode in a sector of the wireless base station and simultaneously receives in non-TDD mode in another sector of the wireless base station.

4. A system according to claim 3 wherein the different modes comprise different air interfaces.

* * * * *